(12) United States Patent
Jain

(10) Patent No.: US 11,223,572 B2
(45) Date of Patent: Jan. 11, 2022

(54) MULTI-TENANT RESOURCE ALLOCATION USING CONTROL GROUPS IN CLOUD-BASED COMPUTING ENVIRONMENT

(71) Applicant: SAP SE, Walldorf (DE)

(72) Inventor: Shashank Mohan Jain, Karnataka (IN)

(73) Assignee: SAP SE, Walldorf (DE)

( * ) Notice: Subject to any disclaimer, the term of this patent is extended or adjusted under 35 U.S.C. 154(b) by 299 days.

(21) Appl. No.: 16/691,966

(22) Filed: Nov. 22, 2019

(65) Prior Publication Data
US 2021/0160192 A1 May 27, 2021

(51) Int. Cl.
| | | |
|---|---|---|
| *G06F 9/46* | (2006.01) | |
| *H04L 12/927* | (2013.01) | |
| *G06F 16/25* | (2019.01) | |
| *G06F 9/54* | (2006.01) | |
| *G06F 9/50* | (2006.01) | |

(52) U.S. Cl.
CPC ............ *H04L 47/80* (2013.01); *G06F 9/5077* (2013.01); *G06F 9/545* (2013.01); *G06F 16/256* (2019.01)

(58) Field of Classification Search
None
See application file for complete search history.

(56) References Cited

U.S. PATENT DOCUMENTS

| | | | |
|---|---|---|---|
| 9,959,188 B1* | 5/2018 | Krishnan | G06F 11/3024 |
| 2011/0282914 A1* | 11/2011 | Block | G06F 16/258 |
| | | | 707/796 |
| 2012/0173581 A1* | 7/2012 | Hartig | G06F 11/0745 |
| | | | 707/781 |
| 2015/0074058 A1* | 3/2015 | Zhao | G06F 11/1458 |
| | | | 707/646 |
| 2017/0201574 A1* | 7/2017 | Luo | H04L 67/34 |
| 2018/0241811 A1* | 8/2018 | Chen | H04L 67/1012 |
| 2019/0065278 A1* | 2/2019 | Jeuk | G06F 9/45558 |
| 2019/0354388 A1* | 11/2019 | Mitra | G06F 9/45558 |
| 2020/0341815 A1* | 10/2020 | Manchale Sridhar | G06N 20/00 |

* cited by examiner

*Primary Examiner* — Adam Lee
(74) *Attorney, Agent, or Firm* — Buckely, Maschoff & Talwalkar LLC

(57) ABSTRACT

Some embodiments may be associated with a cloud-based computing environment. A multi-tenant master process platform, associated with a RDBMS, may create a logical database for a tenant on a physical instance of the cloud-based computing environment. A connection to the logical database may be received from a client user associated with the tenant, and a process for the connection may be created. A process identification number created for the process may then be captured along with the database identifier for the tenant using an in-kernel virtual machine program. The system may send the process identification number and the database identifier to a user space program. The user space program creates a control group with the name of the database identifier and places the process identification number into the control group. The control group can then be limited with respect to a maximum amount of resources (memory, CPU etc.).

17 Claims, 13 Drawing Sheets

MULTI-TENANT RESOURCE ALLOCATION USING CONTROL GROUPS IN CLOUD-BASED COMPUTING ENVIRONMENT

BACKGROUND

An enterprise may utilize applications or services executing in a cloud-based computing environment. For example, a business might utilize applications that access a database at a data center to process purchase orders, human resources tasks, payroll functions, etc. Note that cloud-based computing environment might want to support multiple tenants (e.g., associated with different enterprises). Creating a separate database instance for each tenant, however, can be an expensive approach that consumes substantial resources. As a result, a single instance may be shared among multiple tenants. With some multi-tenant implementations, however, one tenant might execute a complex query (e.g., consuming substantial memory resources, computing power, etc.) which could degrade performance for other tenants resulting in a "noisy neighbor" scenario. It would therefore be desirable to provide multi-tenant support for a cloud-based computing environment in a fair, automatic, and accurate manner.

SUMMARY

Methods and systems may be associated with a cloud-based computing environment. A multi-tenant master process platform, associated with a relational database management system (e.g., a single Postgres instance), may create a logical database for a tenant on a physical instance of the cloud-based computing environment. A connection to the logical database may be received from a client user associated with the tenant, and a process for the connection may be created. A process identification number created for the process may then be captured along with the database identifier for the tenant using an in-kernel virtual machine program. The system may send the process identification number and the database identifier to a user space program. The user space program creates a control group with the name of the database identifier and places the process identification number into the control group. The control group can then be limited with respect to a maximum amount of resources (memory, computer power etc.).

Some embodiments comprise: means for creating, by a computer processor of a multi-tenant master process platform associated with a relational database management system, a logical database for a tenant on a physical instance of the cloud-based computing environment; means for receiving, from a client user associated with the tenant, a connection to the logical database; means for creating a process for the connection; means for capturing a process identification number created for the process and the database identifier for the tenant using an in-kernel virtual machine program; means for sending the process identification number and the database identifier to a user space program; means for creating, by the user space program, a control group with the name of the database identifier; and means for placing the process identification number into the control group, wherein the control group is limited with respect to a maximum amount of resources.

Other embodiments may comprise: means for executing, in connection with a multi-tenant advanced business application programming server runtime, an in-kernel virtual machine when a user-level dynamic tracing probe (uprobe) detects a change in user context, wherein the in-kernel virtual machine includes: a portion running within the kernel to update a shared map with a process identifier of a work process and a target user context, and a user space program to: (i) look up the process identifier and the target user context in a policy database to determine a maximum amount of resources to be allocated to the target user context, and (ii) call a control group applier; means for taking, by the control group applier, the process identifier and the maximum amount of resources; and means for creating, by the control group application, a work process that executes an advanced business application programming dialog step in a specific control group for the target user context.

Some technical advantages of some embodiments disclosed herein are improved systems and methods to provide multi-tenant support for a cloud-based computing environment in a fair, automatic, and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
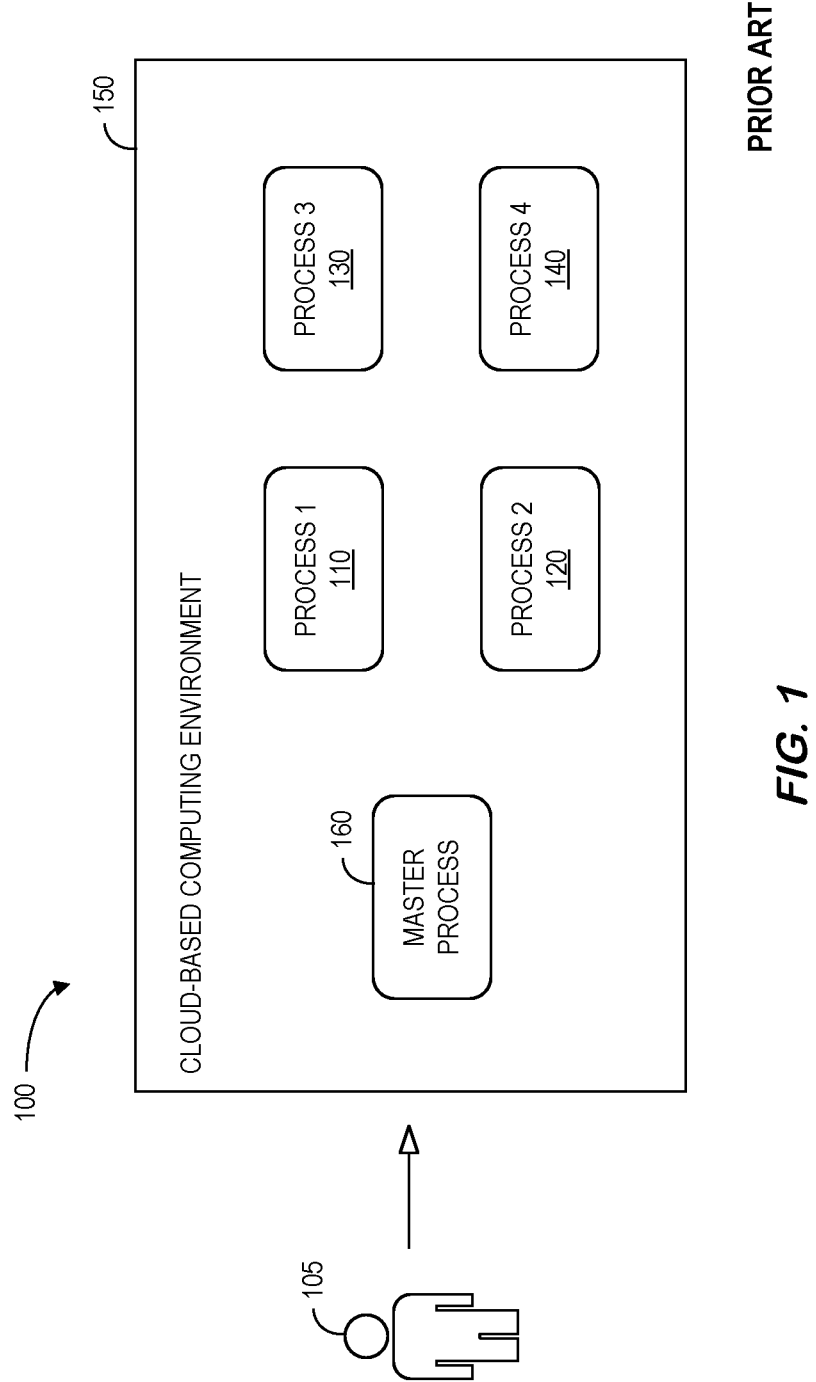
FIG. 1 is a high-level block diagram of a tenant user creating a connection to execute query on a database of a cloud-based computing system.

Some embodiments described herein are associated with Postgres multi-tenancy on a single Postgres instance. For example, FIG. 1 is a high-level block diagram 100 of a tenant user 105 creating a connection to execute query on a database of a cloud-based computing environment 150. Note that Postgres may be provisioned as a single process within a virtual machine. From a cost perspective, it may be detrimental to dedicate one virtual machine per tenant. A better model is to share the same Postgres database across multiple customers (which achieves cost effectiveness by sharing the single instance). As a result, many multi-tenant deployments have a Postgres database as the unit of multi-tenancy. That is, a master process 160 arranges for a logical database to be created for a tenant (and multiple such databases are created on a single physical database hosted within a virtual machine).

While this model may allow some logical separation (e.g., users, system catalog, etc.), it is not a cloud-native way of supporting multi-tenancy. For example, the approach makes multiple processes 110, 120, 130, 140 share some resources, such as memory resources, Central Processing Unit ("CPU") resources, disk resources, network resources, etc. As a result, one tenant 105 can possibly run a big query that leads to 100% CPU utilization. This will technically render other tenants who are hosted on same virtual machine unresponsive. This can also happen, for example, when query runs without an index. The basic problem is that the Postgres database is not built to support multi-tenancy in a cloud-based environment.

Figure 2:
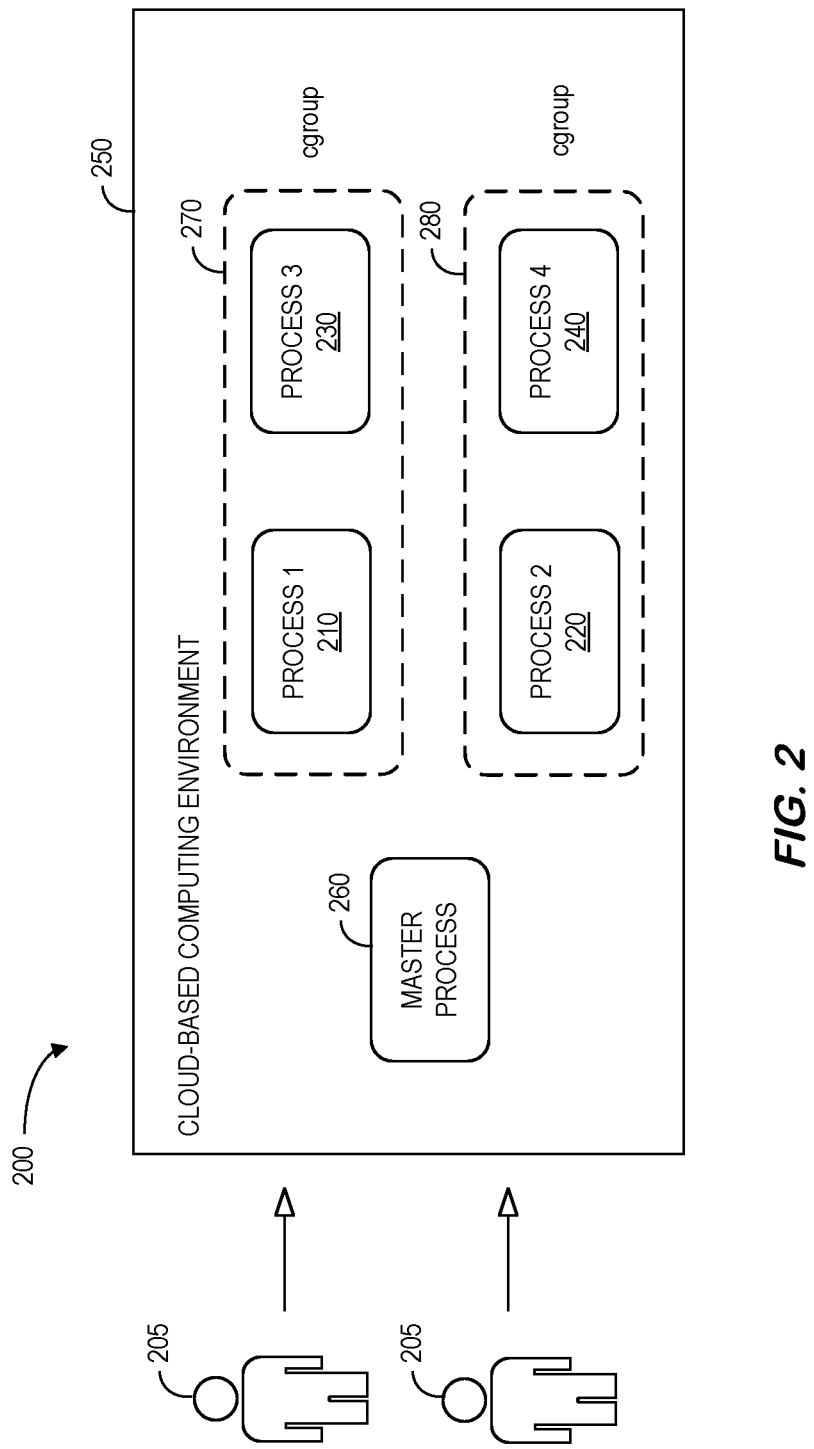
FIG. 2 is a high-level system architecture showing processes per tenant being placed into control groups to enforce resource limits in accordance with some embodiments.

FIG. 2 is a high-level system 200 architecture wherein multiple tenants 205 access a cloud-based computing environment 250. In particular, the system 200 shows a master process 260 placing processes 210, 220, 230, 240 per tenant into control groups 270, 280 to enforce resource limits in accordance with some embodiments. For example, "Process 1" 210 and "Process 3" 230 are placed into one control group 270 while "Process 2" 220 and "Process 4" 240 are placed into another control group 280.

Some embodiments described herein may exploit some of the Linux kernel mechanisms (like control groups or "cgroups") to create a degree of isolation between tenants. Note that cgroups are a mechanism in the Linux kernel that let a set of processes have limits associated with memory, CPU, and block Input Output (TO). What this means is that there are different cgroup controllers that track and account for the memory, CPU and block IO used by a group of processes running within the Operating System ("OS").

Postgres internally follows a process-per-connection model. This means that whenever a connection is requested by a user on the database, a Linux process is created in the background to execute the query for that specific user. Some embodiments described herein use this mechanism to group the processes-per-logical database into a separate cgroup. In some embodiments, a tenant may have a logical database created on a physical instance. The logical database may be, for example, configured for the users with respect to authentications and/or authorizations. Moreover, the logical database may be configured for a maximum number of connections that it can make to the database.

When a client makes a connection to the database that has been configured for the tenant, a Postgres postmaster process may create a process and hand over the connection to that process. An extended Berkley packet filter ("ebpf") program (configured as a user-level dynamic tracing probe or "uprobe") may capture a process identification number ("pid") that was created and the database identifier for the tenant. The ebpf program may send this pid back to a user space program with the pid and database identifier. The users pace program may create a cgroup with the name of the database identifier and place the pid into the cgroup. The cgroup has memory, CPU, and block IO cgroups enabled. This means that the specific process will be constrained by the upper limit configured by cgroups for these resources. When a connection is closed, the process is automatically terminated and removed from the cgroup.

Since the number of connections can be limited for a logical database, this mechanism can limit the physical resources per logical database and/or tenant. As a result, proper resource control and quota enforcement per tenant man be implemented. Embodiments may further extend this model to do network accounting as to how much network bandwidth will be allowed per tenant.

Figure 3:
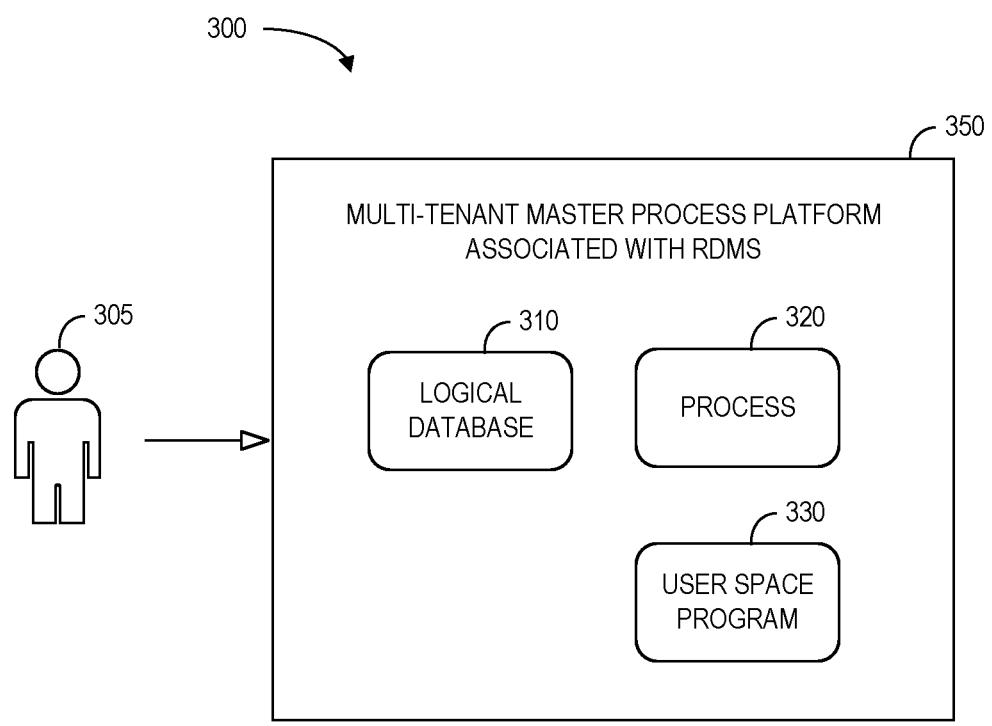
FIG. 3 is block diagram of a cloud-based computing system associated with a RDBMS according to some embodiments.

To provide improved multi-tenant support for a cloud-based computing environment in a fair, automatic, and accurate manner, FIG. 3 is a high-level system 300 architecture in accordance with some embodiments. The system 300 includes a multi-tenant master process platform associated with a Relational Database Management System ("RDBMS") 350 that receives requests from a tenant 305. Moreover, the platform 250 includes a logical database 310, a process 320, and a user space program 330 in accordance with any of the embodiments described herein. As used herein, devices, including those associated with the system 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The platform 350 may store information into and/or retrieve information from various data stores, which may be locally stored or reside remote from the platform 350. Although a single platform 350 is shown in FIG. 3, any number of such devices may be included. Moreover, various devices described herein might be combined according to embodiments of the present invention. The system 300 functions may be performed by a constellation of networked apparatuses, such as in a distributed processing or cloud-based architecture.

An operator or administrator may access the system 300 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to implement various rules and policies) and/or provide or receive automatically generated recommendations or results from the system 300.

Figure 4:
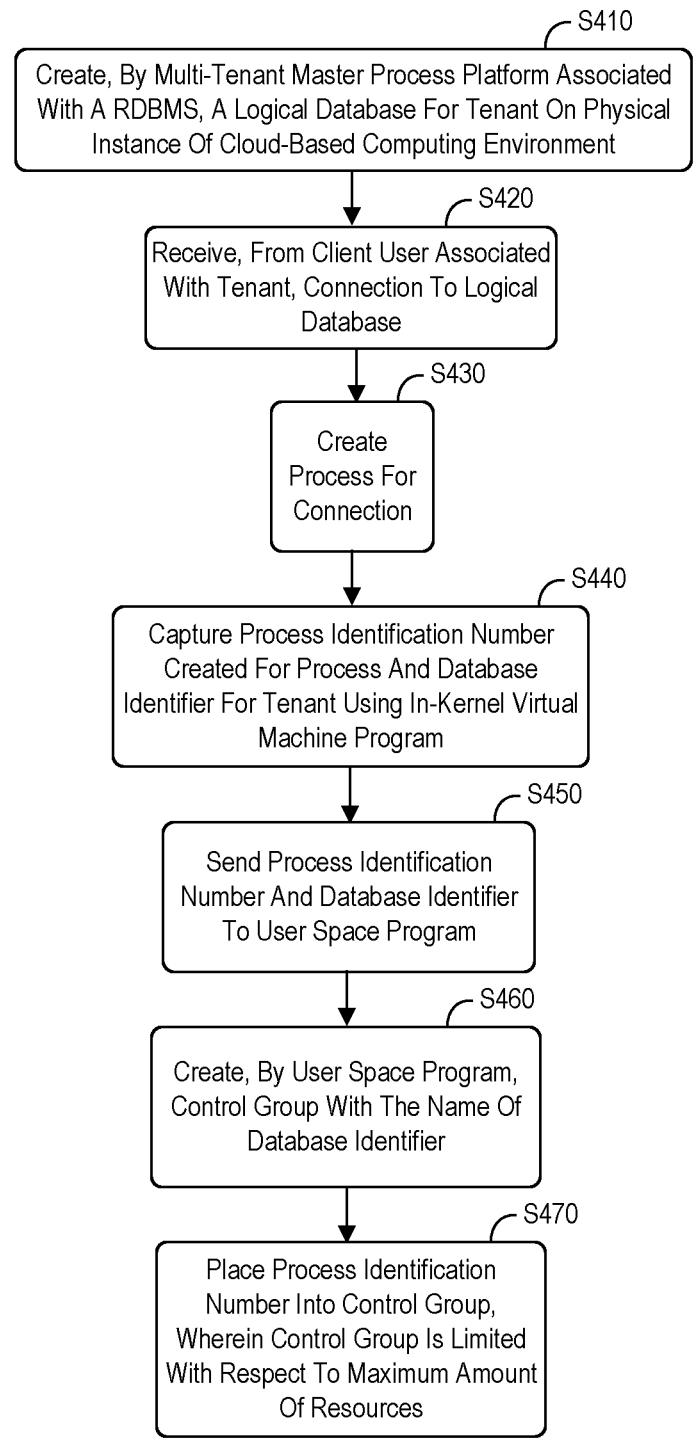
FIG. 4 is a method in accordance with some embodiments.

FIG. 4 is a method that might performed by some or all of the elements of any embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S410, a computer processor of a multi-tenant master process platform associated with a RDBMS, may create a logical database for a tenant on a physical instance of the cloud-based computing environment. At S420, the system may receive, from a client user associated with the tenant, a connection to the logical database. The system may create a process for the connection at S430 and capture a process identification number created for the process and the database identifier for the tenant using an in-kernel virtual machine program at S440. At S450, the system may send the process identification number and the database identifier to a user space program. The user space program may then create a control group with the name of the database identifier at S460. At S470, the user space program may place the process identification number into the control group (and the control group can then be limited with respect to a maximum amount of resources).

Figure 5:
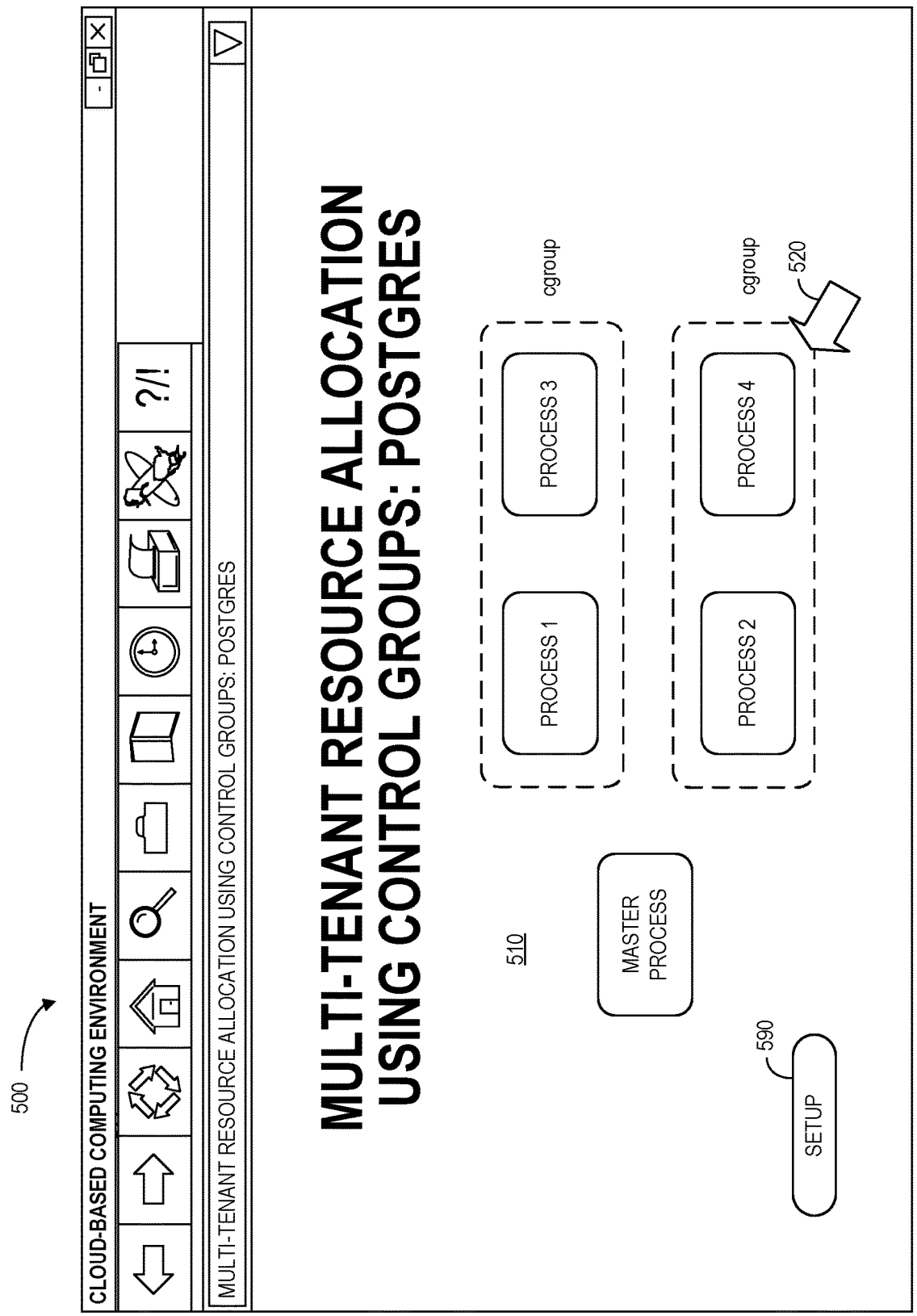
FIG. 5 is a human machine interface display according to some embodiments.

FIG. 5 is a human machine interface display associated with multi-tenancy for a single Postgres instance according to some embodiments. The display 500 includes a graphical representation 510 of elements of cloud-based computing environment system for a cloud computing environment (e.g., to fairly share resources among multiple tenants). Selection of an element (e.g., via a touch-screen or computer pointer 520) may result in display of a pop-up window containing various options (e.g., to adjust rules or logic, assign various devices, etc.). The display 500 may also include a user-selectable "Setup" icon 590 (e.g., to configure parameters for cloud management and/or provisioning (e.g., to alter or adjust resource limits as described herein with respect any of the embodiments of FIGS. 2 through 4)).

Figure 6:
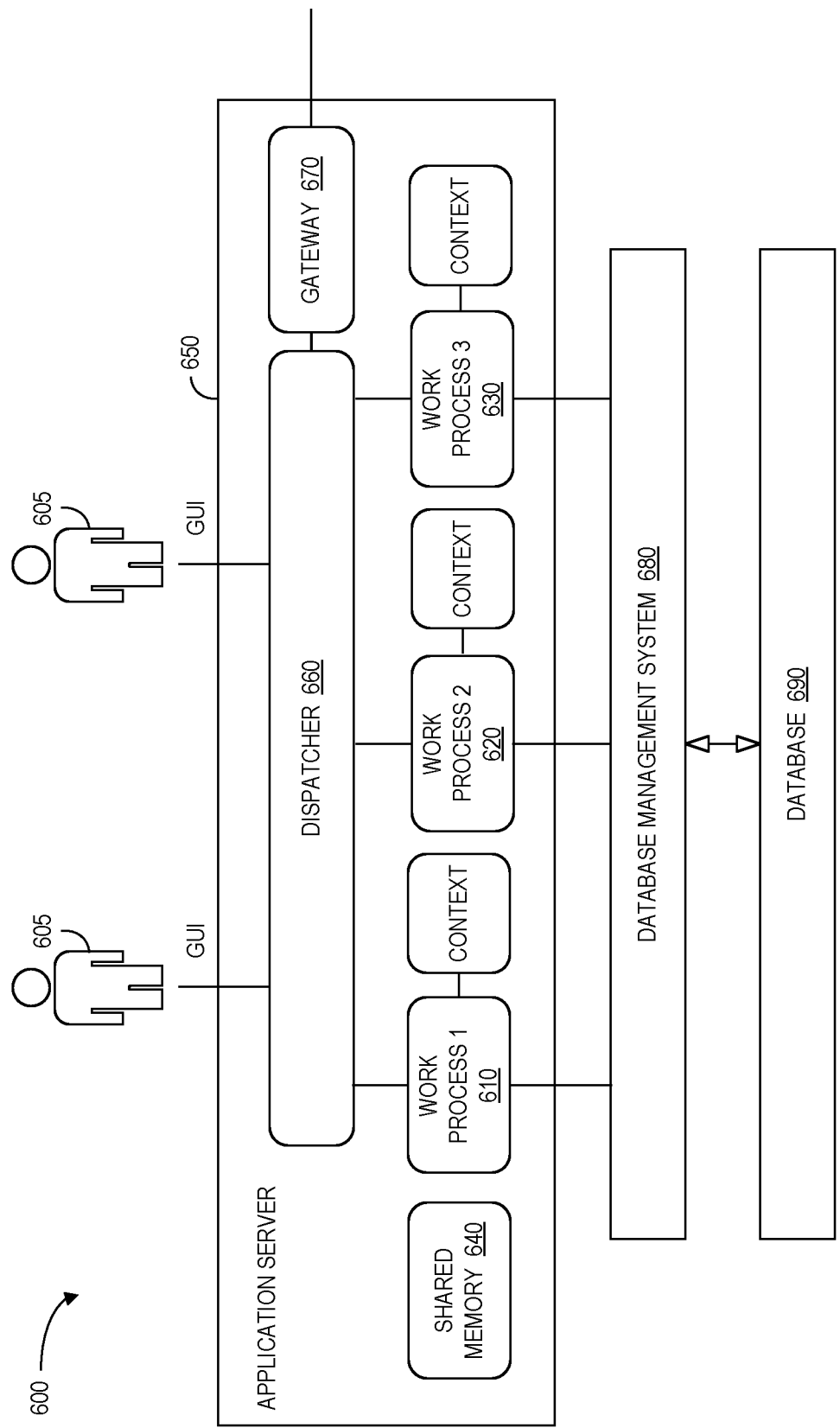
FIG. 6 illustrates a multi-tenant ABAP server in accordance with some embodiments.

FIG. 6 illustrates a multi-tenant ABAP server 600 in accordance with some embodiments. Tenant users 605 may access a Graphical User Interface ("GUI") to communicate with a dispatcher 660 of an application server 650. the dispatcher 660 may exchange information via a gateway 670 and establish work processes 610, 620, 630 (each associated with a user context). The work processes 610, 620, 630 may access shared memory 640 and/or a database 690 via a database management system 680.

Figure 7:
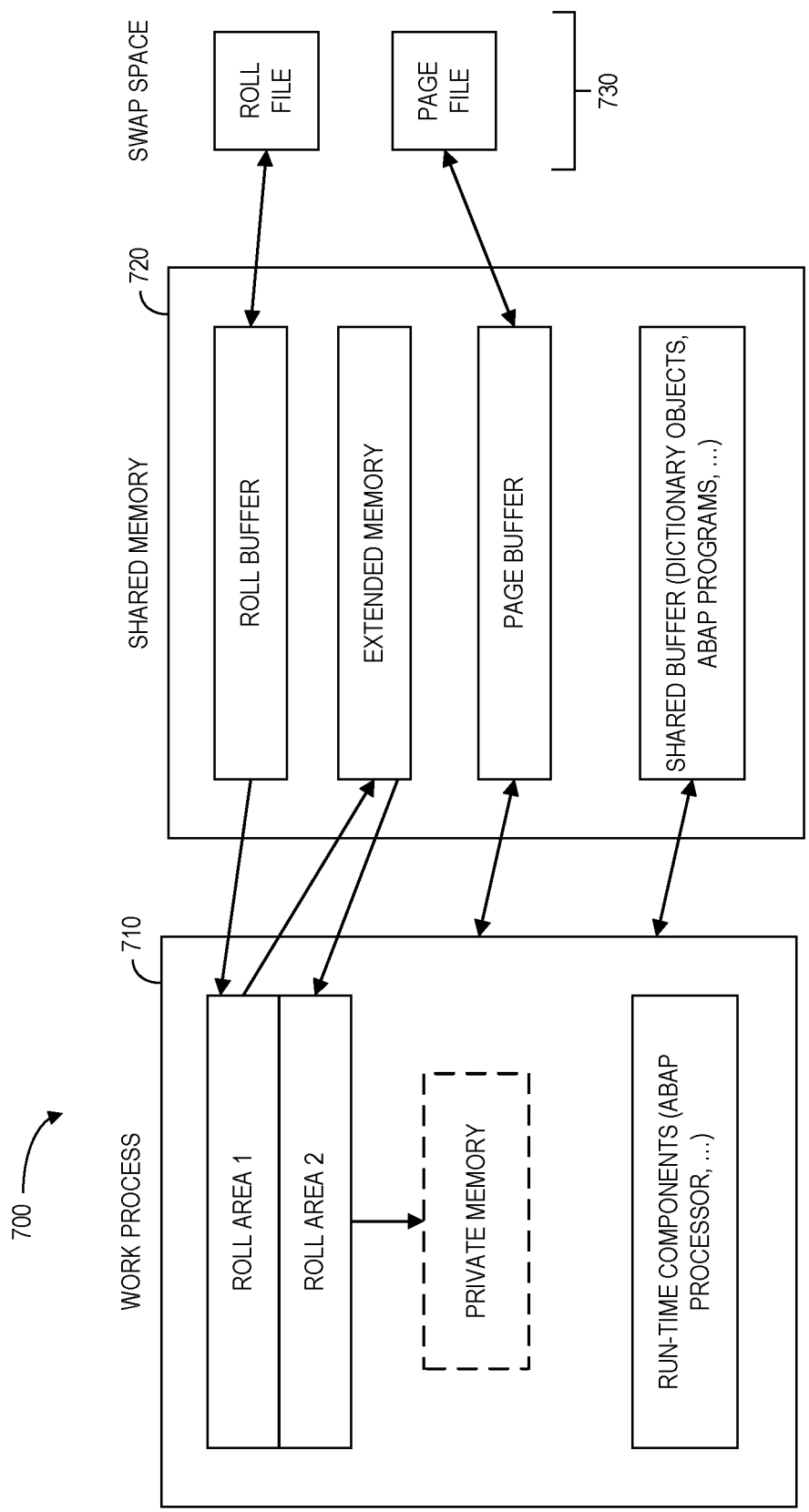
FIG. 7 shows processes and shared memory according to some embodiments.

According to some embodiments, the multi-tenant ABAP application server 650 may provide resource control policies one a per-tenant basis using ebpf and cgroups. Note that the ABAP application server 650 is made up of the set of processes 610, 620, 630 that handle interactive and batch processing requests. FIG. 6 shows how a request submitted via a GUI by a user is handled by a work process 610, 620, 630. The work process 610, 620, 630 itself is a Linux process and is supposed to handle multiple users. A user transaction is represented as a series of dialog steps and at one point in time a work process 610, 620, 630 is handling only a single dialog step. After completion of one dialog step for a user, the same work process 610, 620, 630 can be used to serve another dialog step (e.g., of a different user). This allows concurrent handling of multi-user and tenant workload within the ABAP application server 650. FIG. 7 shows 700 processes and shared memory according to some embodiments. In particular, a work process 710, shared memory 720, and a swap space 730 is illustrated. The work process 710 may include roll areas, private memory, and/or runtime components (e.g., an ABAP processor). The shared memory 720 may include a roll buffer, extended memory, a page buffer, and/or a shared buffer (e.g. for dictionary objects, ABAP programs, etc.). The swap space 730 might include a roll file, a page file, etc. Note that each transaction initiated by a user may be represented as a series of dialog steps, and each dialog step may be executed within a work process 710 (e.g., a dialog work process 710). Each dialog work process 710 (manifested as a Linux process) may use private memory as well as shared memory 720 (as manifested by file mapping mechanism).

The dialog work process 710 is the main work horse for executing a specific interactive user transaction. Each dialog step runs via the ABAP processor and as well has defined memory areas to hold user specific context and data. A Linux process is tasked to handle the specific dialog step. Note that an issue may arise when a step or transaction loads a big query and starts to process it. This may cause code execution of that step within the work process 710 to take more than a fair share of memory (both private and shared memory 720). The same issue can also arise with other resources, such as CPU, IO, etc. This can lead to a scenario where if multiple tenants (user contexts) are getting executed by the same ABAP runtime, a "noisy neighbor" (such as a user context in a single dialog step or multiple dialog steps) starts to consume too many resources, and the other user contexts must wait until those resources are released. This is not an ideal situation and does not work when multi-tenant workloads are placed into a single ABAP application server.

Some embodiments provided herein may cap usage of a work process running for a user context into its own set of cgroups. These cgroups can also be dynamically adjusted based on which user context is being processed at a certain point in time. Then system can define static policies per user as to how much resources that user can consume in terms of memory, CPU and IO. Once a user transaction is started within a work process, the specific limits can be applied to the process. Upon a switch of the user context, the process can start to apply different limits. Each dialog step for a user may thus be capped to an upper limit in terms of resource usage.

Figure 8:
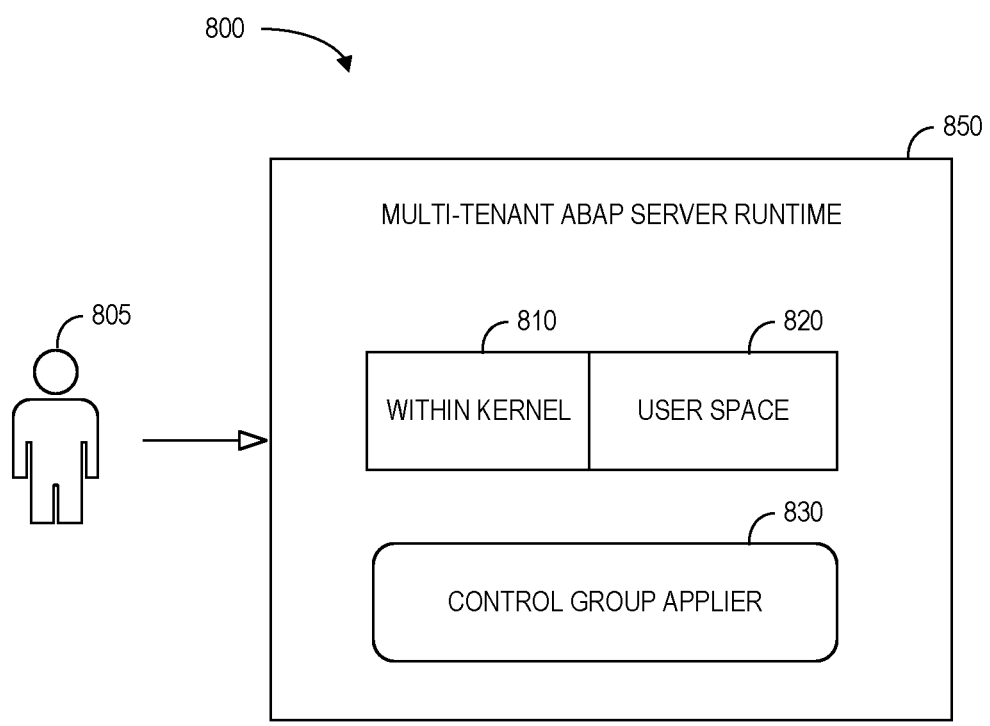
FIG. 8 is block diagram of a cloud-based computing system associated with an ABAP server runtime in accordance with some embodiments.

According to some embodiments, FIG. 8 is block diagram of a cloud-based computing system 800 associated with an ABAP server runtime in accordance with some embodiments. The system 800 may use ebpf with uprobes such that a user probe is defined whenever the ABAP runtime decides to switch a user context. An ebpf program may be defined to execute as a hook whenever the uprobe is encountered during execution.

The ebpf program may be divided into two parts: a part running within the kernel 810 and a user space 820. The part running within the kernel 810 may update a shared map with the pid of the work process and the target user context (the context being switched to). The map may be shared with user space to signal a user space program whenever the user context changes within the ABAP runtime. The user space program 820 may take the pid of the work process and the target user context. The user space program 820 can then check a policy database and, based on what resources are defined for a user context, a cgroup applier 830 may be called. The cgroup applier 830 is a user space program that takes as input the pid and the resource limits for the process pid. The cgroup applier 830 puts the process into the specific cgroup defined for a specific user context.

Consider, for example, two user contexts running within an ABAP runtime. The ABAP runtime starts executing user context 1. The uprobe is triggered which in turn launches the ebpf program registered for the uprobe. The ebpf program gets the pid of the work process as well as the meta-data to identify user context 1. The ebpf program loads this information into a map which it shares with the user space. The user space program takes these inputs and does a lookup into a table to see what resource limits are defined for user context 1. For example, it might determine that user context 1 can only take XMB of memory and a certain CPU and IO quota. The user space program then calls the cgroup applier with the information about pid and the define quota limits. The cgroup applier places the process (work process executing a dialog for a specific user context) into the specific cgroup defined for the user context. The dialog step then runs to completion with the specified resource limits for that specific user context.

Now, if the ABAP runtime decides to switch to running a dialog step for a different user context, it picks the request from the queue and makes a switch to different user context (this entails loading data and structures pertaining to user context 2 within the private memory). At this point, the configured uprobe is again invoked which triggers the ebpf program (which executes the same process of placing the pid of the work process into a cgroup defined for user context 2. The policy will allow multi-tenanted interactive workloads to be run seamlessly without having the trouble of noisy neighbors. According to some embodiments, the approach might be further granularized to apply resource limits on a per dialog step basis if desired. This would mean that for a transaction only a certain step or steps might get more resources (and not all steps in that user context). Note that any of the embodiments described herein might be applied to batch jobs that run via background work processes.

Figure 9:
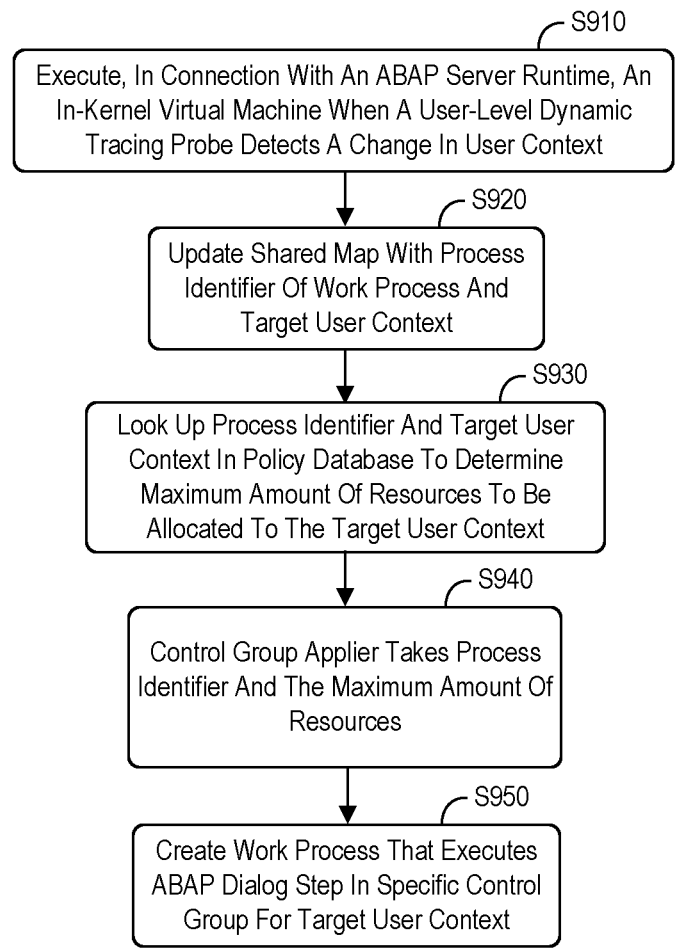
FIG. 9 is a method according to some embodiments.

FIG. 9 is a method according to some embodiments. At S910, the system may execute, in connection with a multi-tenant ABAP server runtime, an in-kernel virtual machine when a user-level dynamic tracing probe detects a change in user context. The in-kernel virtual machine may include a portion running within the kernel to update a shared map with a process identifier of a work process and a target user context at S920. At S930, a user space program may: (i) look up the process identifier and the target user context in a policy database to determine a maximum amount of resources to be allocated to the target user context, and (ii) call a control group applier. At S940 the control group applier may take the process identifier and the maximum amount of resources, and a work process that executes an ABAP dialog step in a specific control group can be created for the target user context at S950.

Figure 10:
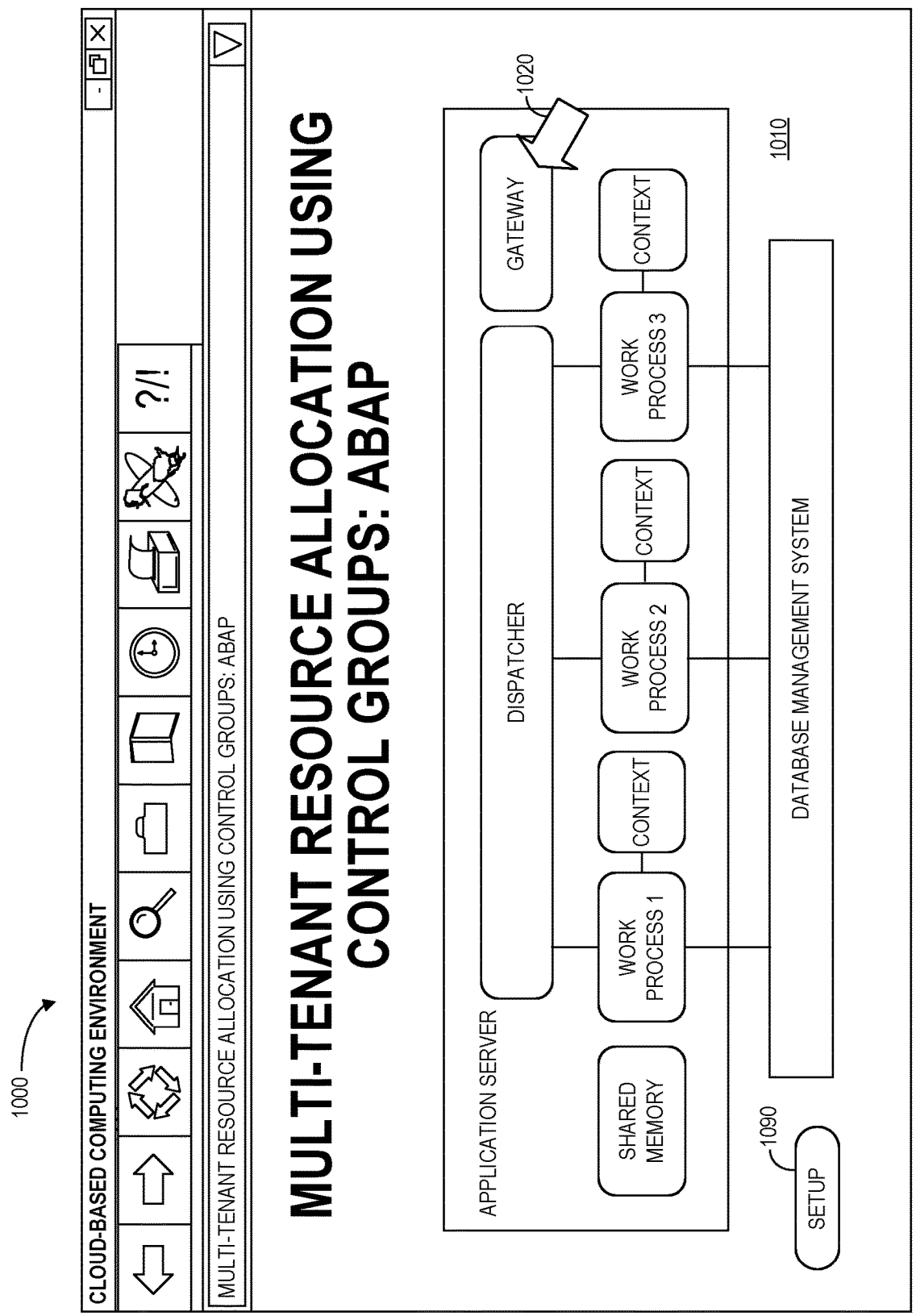
FIG. 10 is a human machine interface display in accordance with some embodiments.

FIG. 10 is a human machine interface display 1000 associated with an ABAP server runtime in accordance with some embodiments. The display 1000 includes a graphical representation 1010 of elements of cloud-based computing environment system for a cloud-based computing environment. Selection of an element (e.g., via a touch-screen or computer pointer 1020) may result in display of a pop-up window containing various options (e.g., to adjust rules or logic, assign various devices, etc.). The display 1000 may also include a user-selectable "Setup" icon 1090 (e.g., to configure parameters for cloud management and/or provisioning (e.g., to alter or adjust resource limits as described with respect any of the embodiments of FIGS. 6 through 9)).

Figure 11:
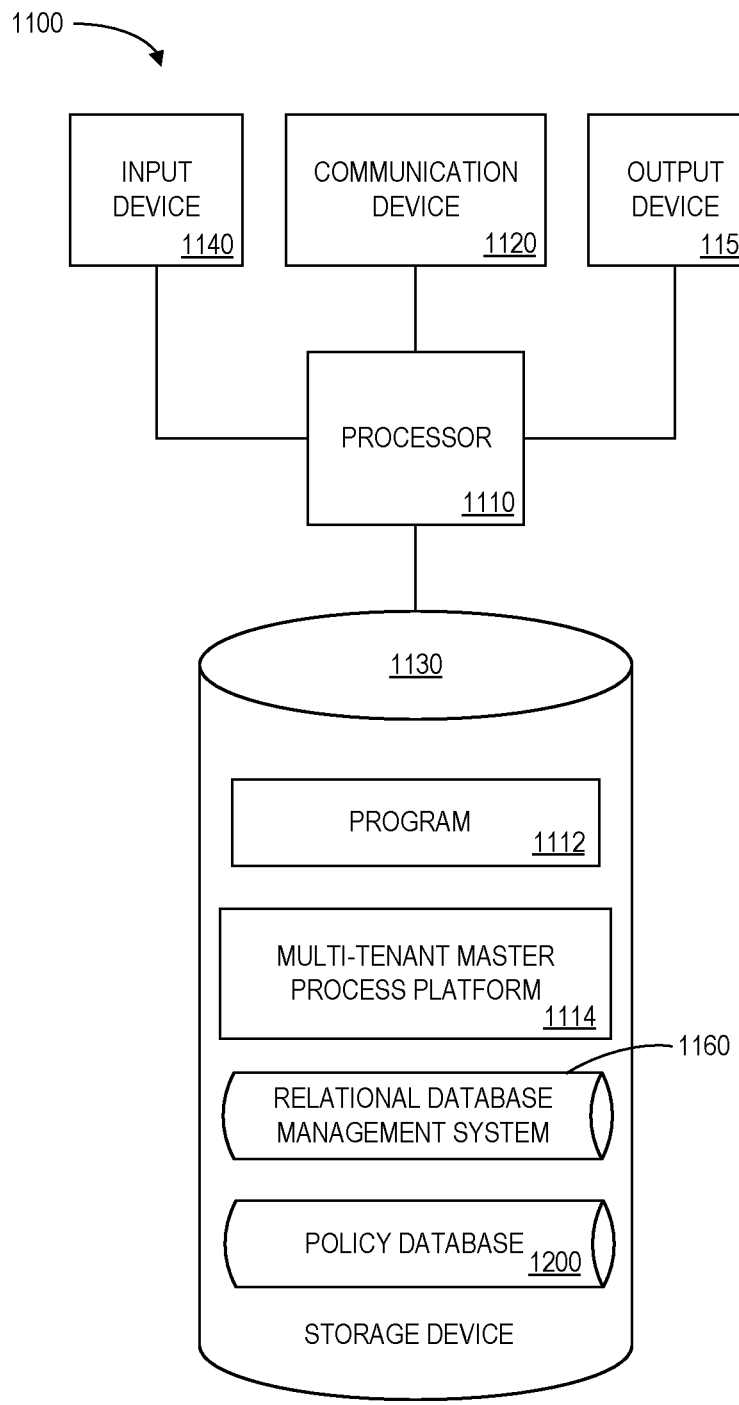
FIG. 11 is an apparatus or platform according to some embodiments.

Note that the embodiments described herein may be implemented using any number of different hardware configurations. For example, FIG. 11 is a block diagram of an apparatus or platform 1100 that may be, for example, associated with the system 200 of FIG. 2 (and/or any other system described herein). The platform 1100 comprises a processor 1110, such as one or more commercially available Central Processing Units ("CPUs") in the form of one-chip microprocessors, coupled to a communication device 1160 configured to communicate via a communication network (not shown in FIG. 11). The communication device 1160 may be used to communicate, for example, with one or more remote user platforms, cloud resource providers, etc. The platform 1100 further includes an input device 1140 (e.g., a computer mouse and/or keyboard to input resource limits, rules, or logic) and/an output device 1150 (e.g., a computer monitor to render a display, transmit recommendations, and/or create data center reports). According to some embodiments, a mobile device and/or PC may be used to exchange information with the platform 1100.

The processor 1110 also communicates with a storage device 1130. The storage device 1130 can be implemented as a single database or the different components of the storage device 1130 can be distributed using multiple databases (that is, different deployment information storage options are possible). The storage device 1130 may comprise any appropriate information storage device, including combinations of magnetic storage devices (e.g., a hard disk drive), optical storage devices, mobile telephones, and/or semiconductor memory devices. The storage device 1130 stores a program 1112 and/or multi-tenant master process platform 1114 for controlling the processor 1110. The processor 1110 performs instructions of the programs 1112, 1114, and thereby operates in accordance with any of the embodiments described herein. For example, the processor 1110 may create a logical database for a tenant on a physical instance of the cloud-based computing environment. A connection to the logical database may be received from a client user associated with the tenant, and a process for the connection may be created by the processor 1110. A process identification number created for the process may then be captured by the processor 1110 along with the database identifier for the tenant using an in-kernel virtual machine program. The processor 1110 may send the process identification number and the database identifier to a user space program. The user space program creates a control group with the name of the database identifier and places the process identification number into the control group. The control group can then be limited by the processor 1110 with respect to a maximum amount of resources (memory, CPU etc.).

The programs 1112, 1114 may be stored in a compressed, uncompiled and/or encrypted format. The programs 1112, 1114 may furthermore include other program elements, such as an operating system, clipboard application, a database management system, and/or device drivers used by the processor 1110 to interface with peripheral devices.

As used herein, information may be "received" by or "transmitted" to, for example: (i) the platform 1100 from another device; or (ii) a software application or module within the platform 1100 from another software application, module, or any other source.

In some embodiments (such as the one shown in FIG. 11), the storage device 1130 further stores a RDBMS 1160 and a policy database 1200. An example of a database that may be used in connection with the platform 1100 will now be described in detail with respect to FIG. 12. Note that the database described herein is only one example, and additional and/or different information may be stored therein. Moreover, various databases might be split or combined in accordance with any of the embodiments described herein.

Figure 12:
FIG. 12 illustrates a web assembly database in accordance with some embodiments.

Referring to FIG. 12, a table is shown that represents the policy database 1200 that may be stored at the platform 1200 according to some embodiments. The table may include, for example, entries define resource limits for various user contexts. The table may also define fields 1202, 1204, 1206, 1208, for each of the entries. The fields 1202, 1204, 1206, 1208 may, according to some embodiments, specify: a context identifier 1202, a RAM limit 1204, a CPU limit 1206, and a block IO limit 1208. The policy database 1200 may be created and updated, for example, when resource limits change, a new user context is defined, etc. According to some embodiments, the policy database 1200 may further store details about various process identifiers and/or dialog steps.

The context identifier 1202 might be a unique alphanumeric label or link that is associated with a particular tenant or user who might access an ABAP server runtime. The RANI limit 1204 might represent a maximum amount of memory that will be allocated to that context identifier 1202. The CPU limit 1206 might represent a maximum amount of processor utilization that will be allocated to that context identifier 1202. The block IO limit 1208 might represent a maximum amount of network bandwidth that will be allocated to that context identifier 1202. Although simple numerical limits are illustrated in FIG. 12, note that other types of dynamic and/or more complex resource limit rules or logic could be implemented instead.

Thus, embodiments may provide multi-tenant support for a cloud-based computing environment in a fair, automatic, and accurate manner. Moreover, the multiple tenants may operate (e.g., including execution of complex database queries) without interfering with other tenants—improving the performance of the system.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 13:
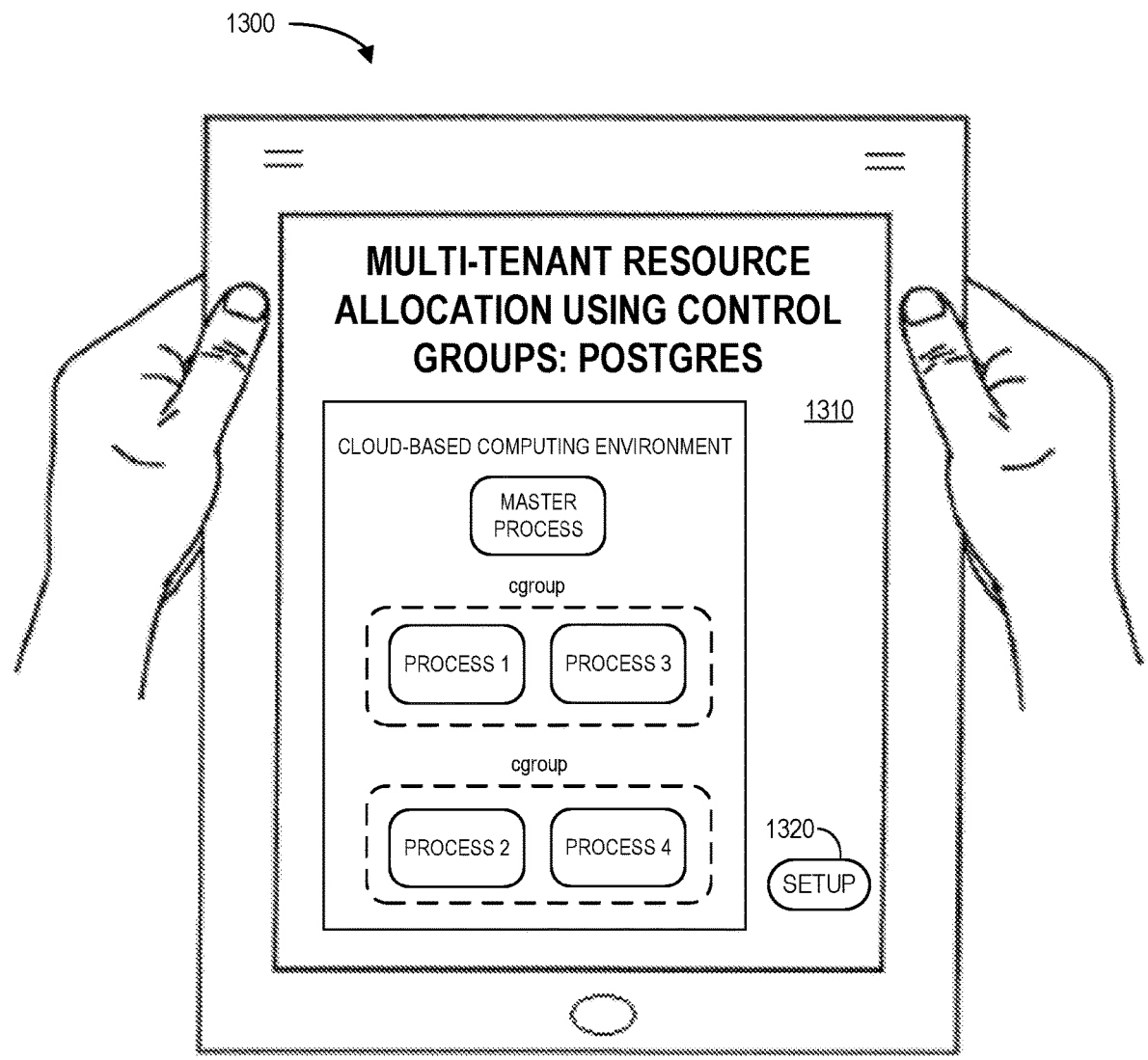
FIG. 13 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of database applications and services, any of the embodiments described herein could be applied to other types of applications and services. In addition, the displays shown herein are provided only as examples, and any other type of user interface could be implemented. For example, FIG. 13 shows a tablet computer 1300 rendering a multi-tenant system ABAP server runtime display 1310. The display 1310 may, according to some embodiments, be used to view more detailed elements about components of the system (e.g., when a graphical element is selected via a touchscreen) or to configure operation of the system (e.g., to establish new resource limits, rules, or logic for the system via a "Setup" icon 1320).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A computing system within a cloud-based computing environment, comprising:
a multi-tenant master process platform including:
a computer processor, and
a memory storage device storing a Relational Database Management System (RDBMS) and storing instructions that when executed by the computer processor enable the computing system to:
create a logical database on the multi-tenant master process platform for a tenant of the cloud-based computing environment,
receive, from a client user of the tenant, a connection to the logical database,
create a process for the connection,
create a process identification number for the process,
create a database identifier for the logical database,
capture the process identification number and the database identifier using a virtual machine program executing within a kernel of the computing system,
send the process identification number and the database identifier to a user space program on the multi-tenant master process platform,
create, by the user space program, a control group with the name of the database identifier, the control group to be used by the tenant, and
place the process into the control group, wherein the amount of resources that can be consumed by the total number of processes within the control group is limited to be at or below a maximum amount of resources allocated to the control group, wherein the tenant executes the process to access the logical database, and wherein the number of connections to the logical database is limited to be at or below a maximum number of connections.

2. The computing system of claim 1, wherein the maximum amount of resources is at least one of: (i) a maximum amount of memory of the memory storage device allocated to the tenant, (ii) a maximum amount of central processing unit usage of the computer processor allocated to the tenant, and (iii) a maximum amount of network bandwidth allocated to the tenant.

3. The computing system of claim 1, wherein:
the RDBMS is configured as a Postgres RDBMS,
the multi-tenant master process platform is configured as a Linux platform, and
the virtual machine is configured as an extended Berkley packet filter ("ebpf") virtual machine.

4. The computing system of claim 3, wherein the ebpf virtual machine is configured as a user-level dynamic tracing probe (uprobe).

5. The computing system of claim 1, wherein the memory storage device of the multi-tenant master process platform further includes instructions that when executed by the computer processor enable the computing system to:
configure the logical database for authentication and authorization of client users.

6. A method executed by a computing system within a cloud-based computing environment, comprising:

creating, by a computer processor of a multi-tenant master process platform, a logical database on the multi-tenant master process platform for a tenant of the cloud-based computing environment, wherein the computing system includes the multi-tenant master process platform, and the multi-tenant master process platform includes the computer processor and a memory storage device storing a Relational Database Management System (RDBMS);

receiving, from a client user of the tenant, a connection to the logical database;

creating a process for the connection;

creating a process identification number for the process, creating a database identifier for the logical database, capturing the process identification number and the database identifier using a virtual machine program executing within a kernel of the computing system;

sending the process identification number and the database identifier to a user space program on the multi-tenant master process platform;

creating, by the user space program, a control group with the name of the database identifier, the control group to be used by the tenant; and placing the process into the control group, wherein the amount of resources that can be consumed by the total number of processes within the control group is limited to be at or below a maximum amount of resources allocated to the control group, wherein the tenant executes the process to access the logical database, and wherein the number of connections to the logical database is limited to be at or below a maximum number of connections.

7. The method of claim 6, wherein the maximum amount of resources is at least one of: (i) a maximum amount of memory of the memory storage device allocated to the tenant, (ii) a maximum amount of central processing unit usage of the computer processor allocated to the tenant, and (iii) a maximum amount of network bandwidth allocated to the tenant.

8. The method of claim 6, wherein:
the RDBMS is configured as a Postgres RDBMS,
the multi-tenant master process platform is configured as a Linux platform, and
the virtual machine is configured as an extended Berkley packet filter ("ebpf") virtual machine.

9. The method of claim 8, wherein the ebpf virtual machine is configured as a user-level dynamic tracing probe (uprobe).

10. The method of claim 6, further comprising:
configuring the logical database for authentication and authorization of client users.

11. A computing system a within cloud computing environment, comprising:
a multi-tenant Advanced Business Application Programming ("ABAP") server runtime, including:
 a computer processor, and
 a memory storage device including instructions that when executed by the computer processor enable the computing system to:
  execute a virtual machine within the multi-tenant ABAP server runtime when a user-level dynamic tracing probe of the multi-tenant ABAP server runtime detects a change in a user context within the multi-tenant ABAP server runtime, the virtual machine including:
   a portion running within a kernel of the multi-tenant ABAP server runtime to update a policy database stored in the memory storage device with a process identifier of a work process and a target user context, the policy database being shared between the portion of the virtual machine and a user space program of the virtual machine, and
   the user space program to: (i) look up the process identifier and the target user context in the policy database, wherein the user space program determines a maximum amount of resources to be allocated to the target user context based on the process identifier and the target user context, and (ii) call a control group applier of the multi-tenant ABAP server runtime, wherein the control group applier creates a work process based on the process identifier and the determined maximum amount of resources, and wherein the created work process executes an ABAP dialog step in a specific control group for the target user context.

12. The computing system of claim 11, wherein the maximum amount of resources is at least one of: (i) a maximum amount of memory of the memory storage device allocated to the target user context, (ii) a maximum amount of central processing unit usage of the computer processor allocated to the target user context, and (iii) a maximum amount of network bandwidth allocated to the target user context.

13. The computing system of claim 11, wherein:
the virtual machine is configured as an extended Berkley packet filter ("ebpf") virtual machine, and
the user-level dynamic tracing probe is configured as a uprobe.

14. The computing system of claim 11, wherein the target user context is associated with a batch job run by a background work process of the specific control group.

15. A method executed by a computing system within a cloud computing environment, comprising:
executing, by a multi-tenant Advanced Business Application Programming ("ABAP") server runtime including a computer processor and a memory storage device, a virtual machine within the ABAP server runtime when a user-level dynamic tracing probe of the multi-tenant ABAP server runtime detects a change in a user context within the multi-tenant ABAP server runtime, wherein the virtual machine includes:
 a portion running within a kernel of the multi-tenant ABAP server runtime to update a policy database stored in the memory storage device with a process identifier of a work process and a target user context, the policy database being shared between the portion of the virtual machine and a user space program of the virtual machine, and
 the user space program to: (i) look up the process identifier and the target user context in the policy database, wherein the user space program determines a maximum amount of resources to be allocated to the target user context based on the process identifier and the target user context, and (ii) call a control group applier of the multi-tenant ABAP server runtime; and
creating, by the control group applier, a work process based on the process identifier and the maximum amount of resources, wherein the created work process executes an ABAP dialog step in a specific control group for the target user context.

16. The method of claim 15, wherein the wherein the maximum amount of resources is at least one of: (i) a maximum amount of memory of the memory storage device allocated to the target user context, (ii) a maximum amount of central processing unit usage of the computer processor allocated to the target user context, and (iii) a maximum amount of network bandwidth allocated to the target user context.

17. The method of claim 15, wherein:
   the virtual machine is configured as an extended Berkley packet filter ("ebpf") virtual machine, and
   the user-level dynamic tracing probe is configured as a uprobe.

\* \* \* \* \*